(12) United States Patent
Maeng et al.

(10) Patent No.: US 11,206,726 B2
(45) Date of Patent: Dec. 21, 2021

(54) SMART LIGHTING AND OPERATION METHOD THEREOF

(71) Applicant: LG ELECTRONICS INC., Seoul (KR)

(72) Inventors: Ji Chan Maeng, Seoul (KR); Beom Oh Kim, Suwon-si (KR); Won Ho Shin, Seoul (KR); Tae Hyun Kim, Seoul (KR); Jong Hoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 16/684,475

(22) Filed: Nov. 14, 2019

(65) Prior Publication Data

US 2021/0022218 A1 Jan. 21, 2021

(30) Foreign Application Priority Data

Jul. 19, 2019 (KR) .......................... 10-2019-0087714

(51) Int. Cl.
*H05B 47/175* (2020.01)
*H05B 47/12* (2020.01)
*G06F 3/16* (2006.01)
*G10L 15/22* (2006.01)
*H04L 12/28* (2006.01)

(52) U.S. Cl.
CPC .......... *H05B 47/175* (2020.01); *G06F 3/167* (2013.01); *G10L 15/22* (2013.01); *H04L 12/282* (2013.01); *H05B 47/12* (2020.01); *G10L 2015/223* (2013.01)

(58) Field of Classification Search
CPC ........ H05B 45/10; H05B 45/20; H05B 47/11; H05B 47/19; H05B 47/105; H05B 47/155; H05B 47/175; H05B 47/12; Y02B 20/40; F21V 23/003; H04L 12/282; H04L 12/2825
See application file for complete search history.

(56) References Cited

U.S. PATENT DOCUMENTS 6,548,967 B1 * 4/2003 Dowling ................ H05B 45/10
315/318
8,963,428 B2 * 2/2015 Kang ..................... H05B 45/20
315/117

(Continued)

FOREIGN PATENT DOCUMENTS

KR  10-2005-0066328  6/2005
KR  10-2015-0068013  6/2015

*Primary Examiner* — Haissa Philogene
(74) *Attorney, Agent, or Firm* — Lee Hong Degerman Kang & Waimey

(57) ABSTRACT

The present invention relates to a smart lighting and an operation method thereof, characterized in that the smart lighting communicates with surrounding electronic devices in a 5G communication environment, and on the basis of such communication and through machine learning, the smart lighting shows operational information of an electronic device when a control command is inputted. When a control command for an operation of an electronic device is generated by a user, information of the operation of the electronic device according to the generated control command is shown through the smart lighting, to thereby improve user convenience in using the electronic device.

19 Claims, 10 Drawing Sheets

(56) References Cited

U.S. PATENT DOCUMENTS

| | | | | |
|---|---|---|---|---|
| 9,035,569 B2* | 5/2015 | Yokosawa | ............... | H05B 47/10 315/291 |
| 9,756,708 B2* | 9/2017 | Kim | ............ | H05B 47/19 |
| 10,271,410 B1* | 4/2019 | Wang | ................ | H05B 47/19 |

* cited by examiner

[FIG. 1]
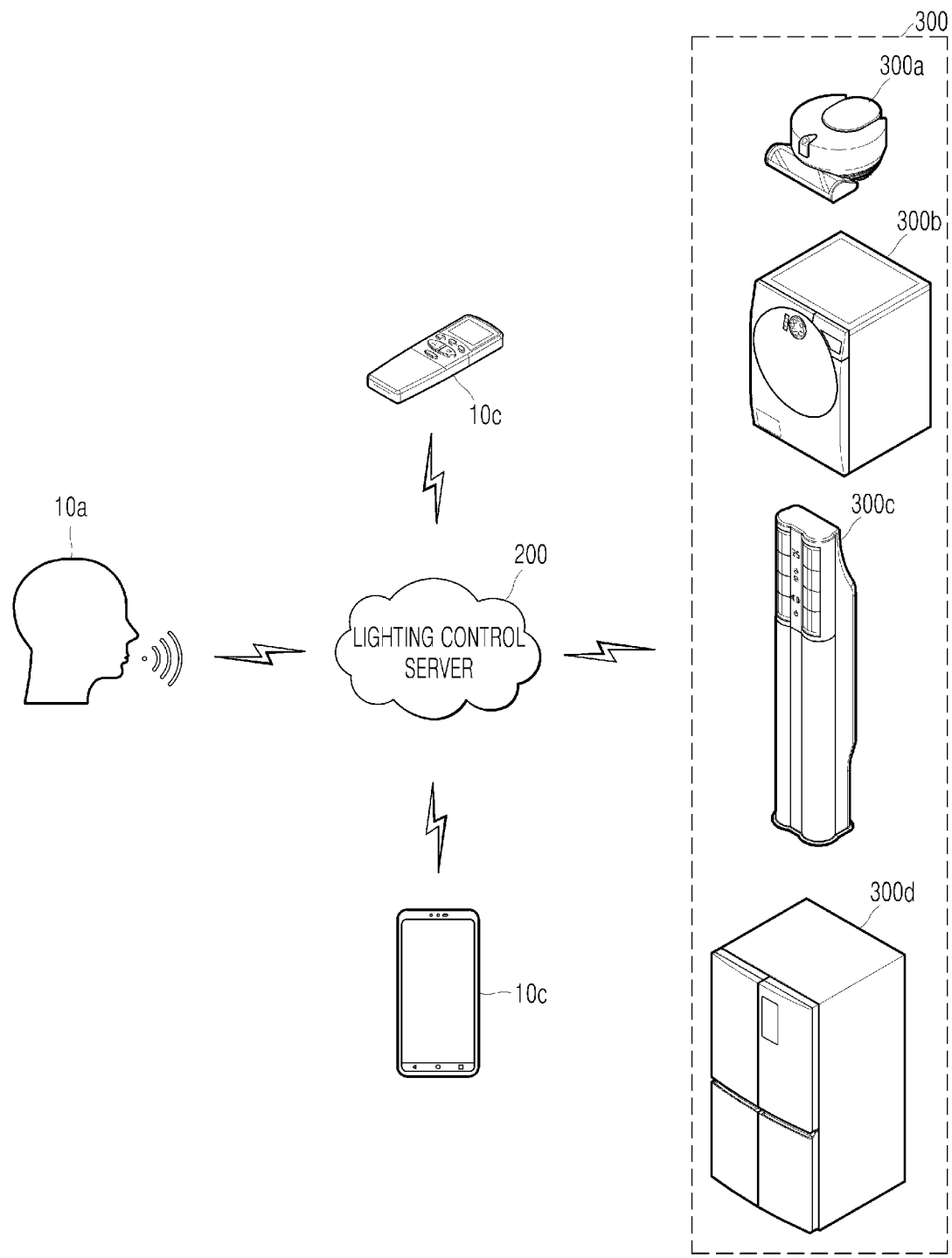

[FIG. 2]
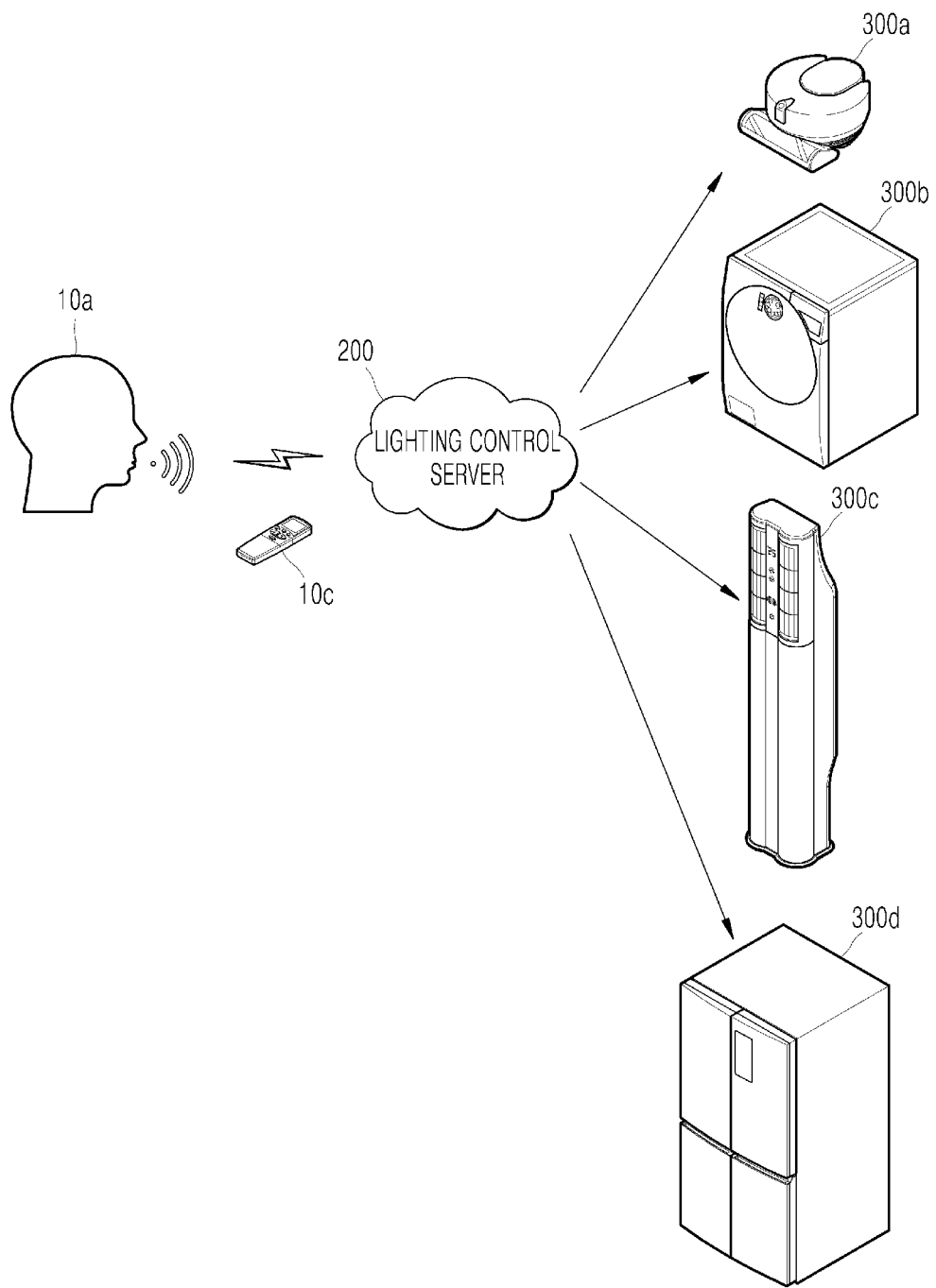

[FIG. 3]
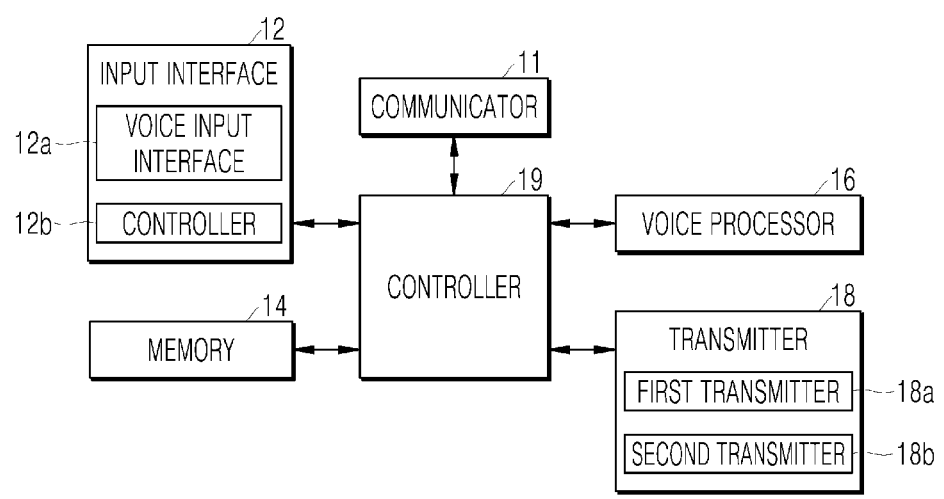

[FIG. 4]
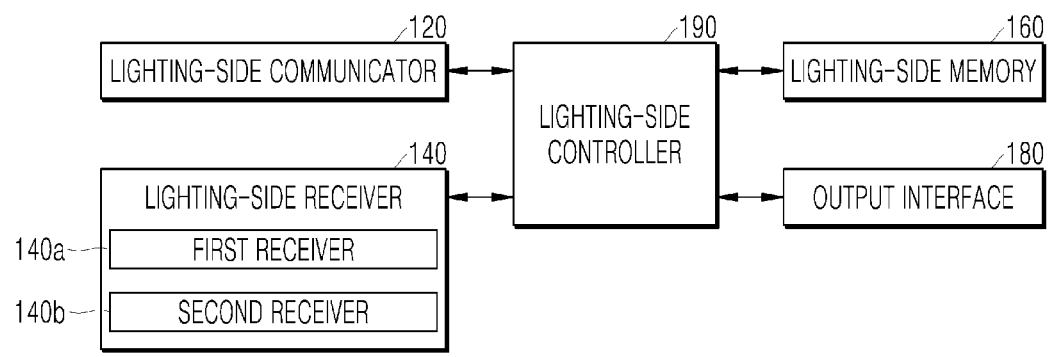

[FIG. 5]
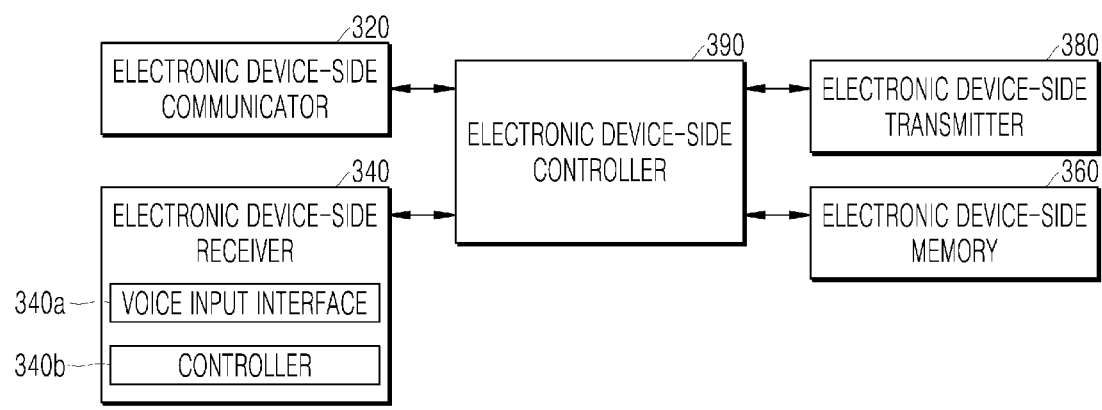

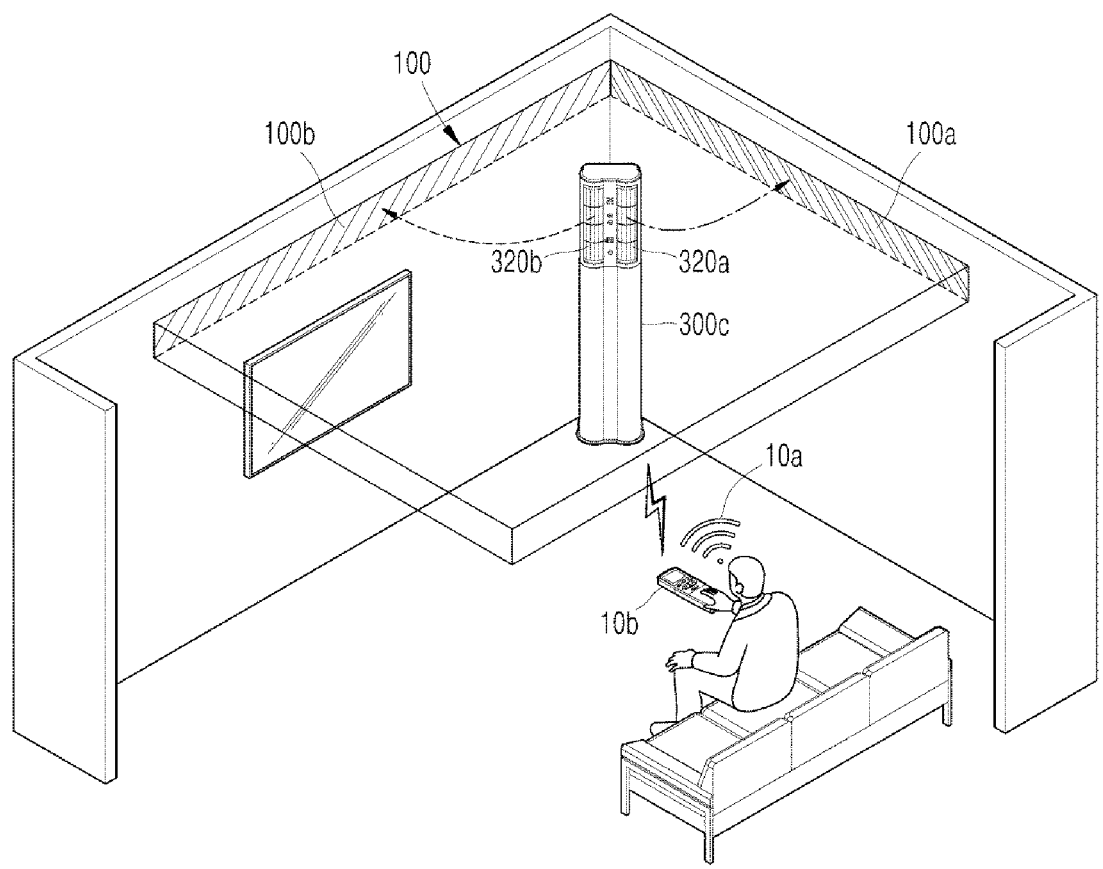
[FIG. 6]

[FIG. 7]
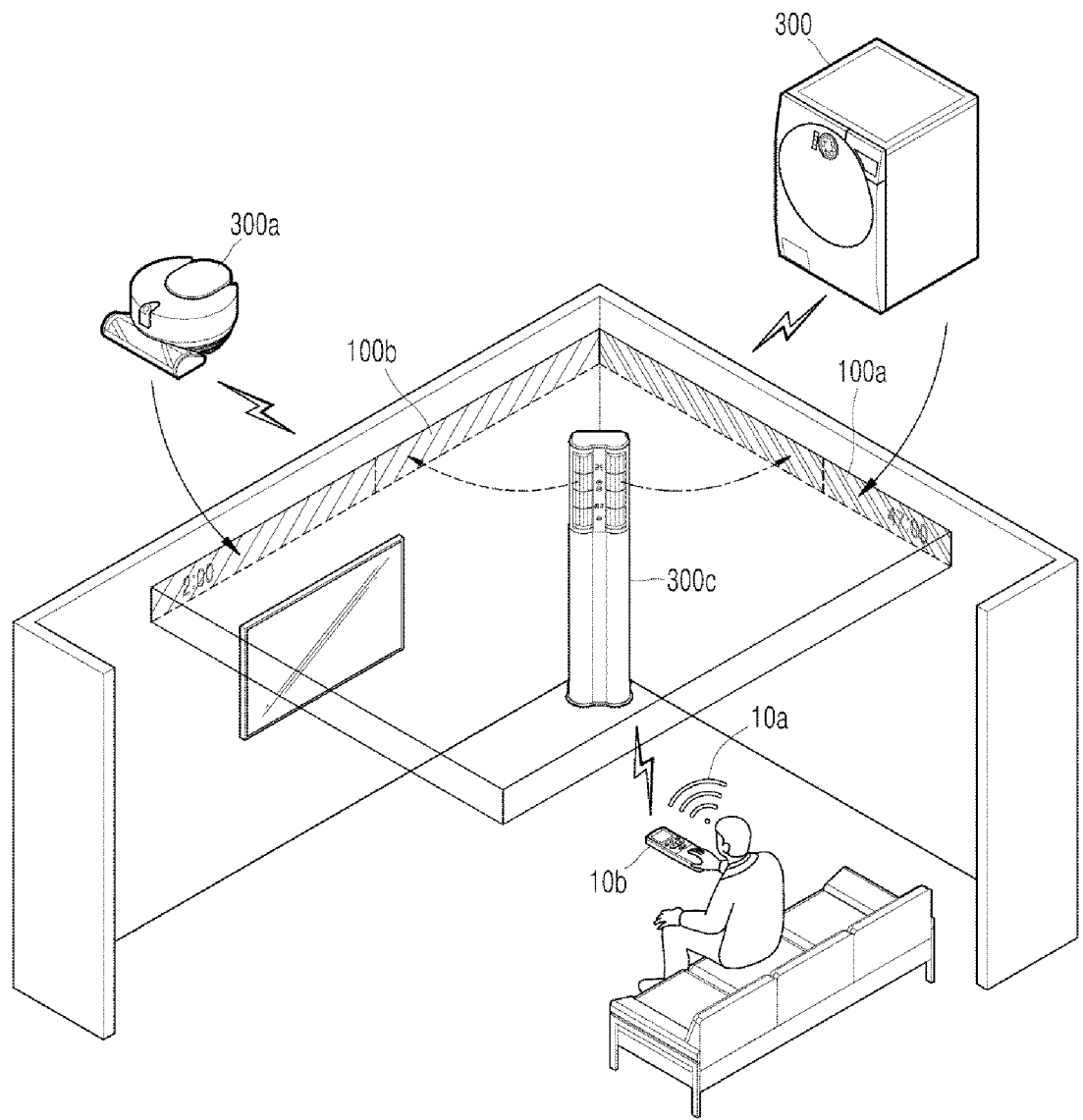

[FIG. 8]
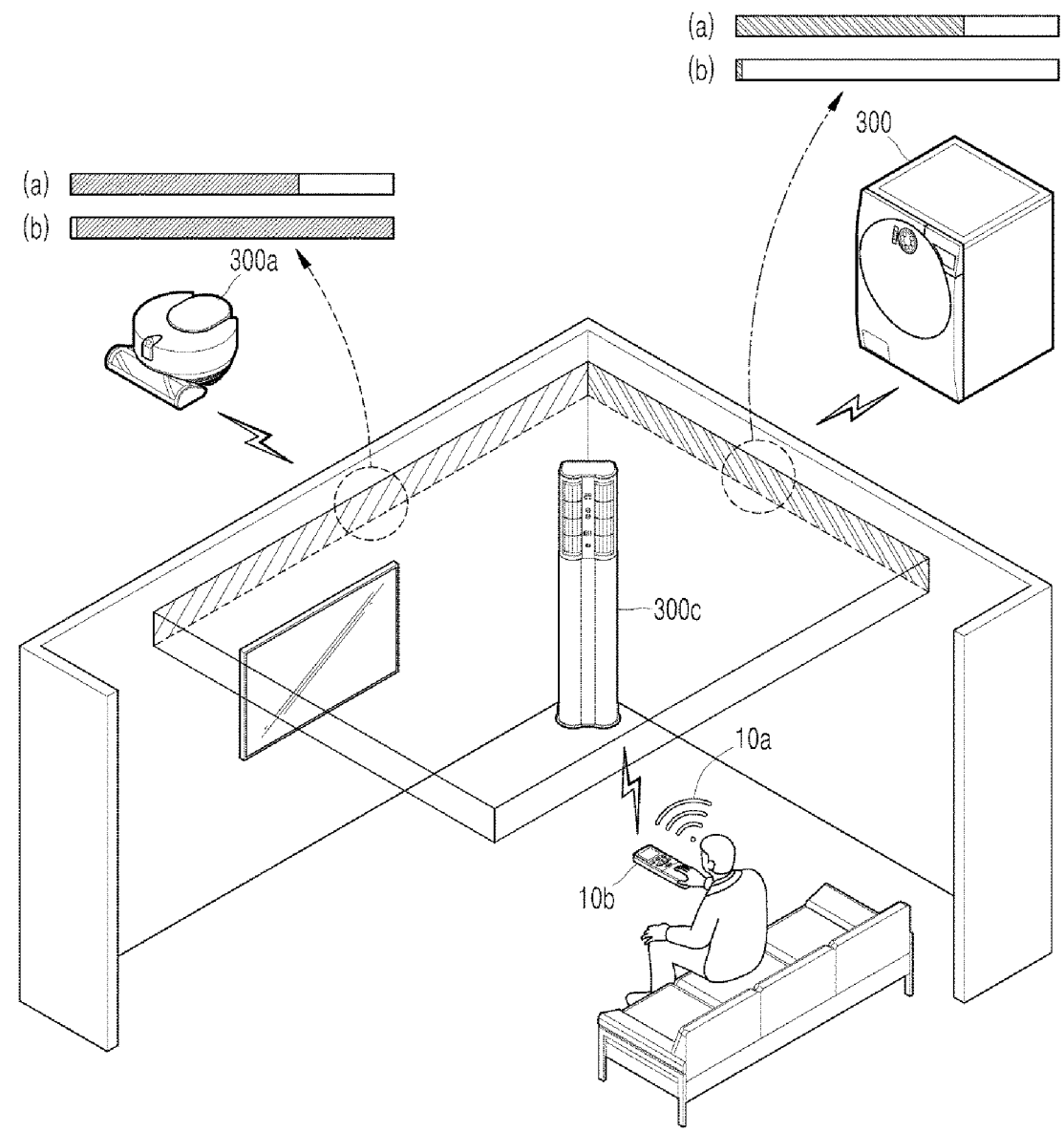

[FIG. 9]
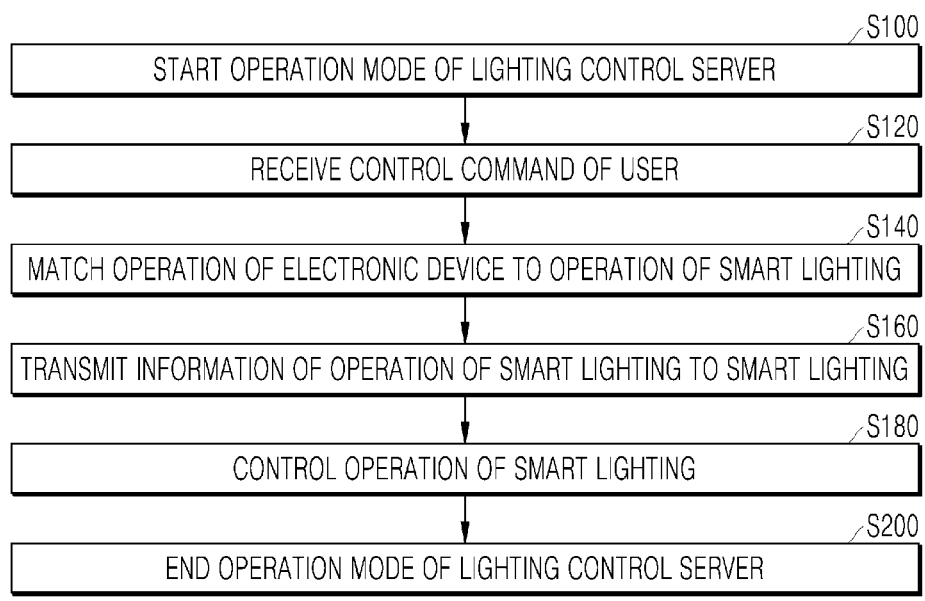

[FIG. 10]
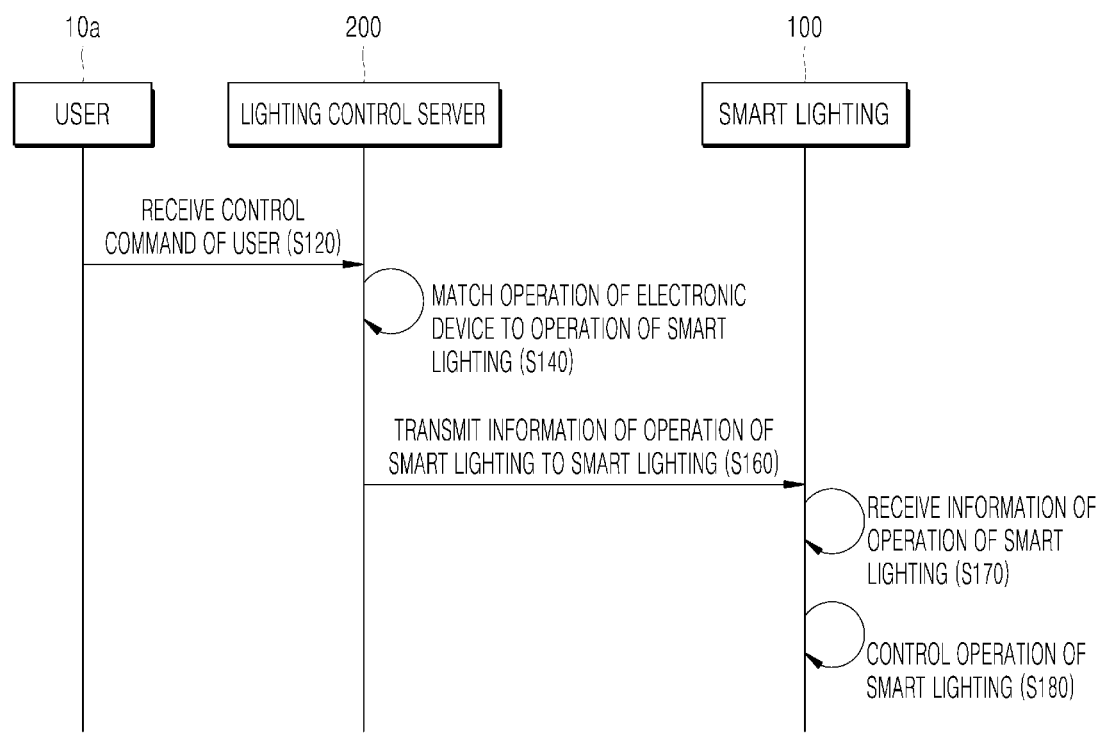

SMART LIGHTING AND OPERATION METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0087714, filed on Jul. 19, 2019, the contents of which are all hereby incorporated by reference herein in its entirety.

BACKGROUND

1. Field

The present disclosure relates to a smart lighting and an operation method thereof. More particularly, the present disclosure relates to a smart lighting and an operation method thereof, characterized in that operational information of an electronic device is shown through the smart lighting, thereby improving user convenience in using the electronic device.

2. Description of Related Art

Related Art Documents

Related Art 1: Korean Patent Application Publication No. 10-2005-0066328 (published on Jun. 30, 2005), 'Method for Controlling of Home Appliance Using Smart Server'

Related Art 2: Korean Patent Application Publication No. 10-2015-0068013 (published on Jun. 19, 2016), 'Smart Home Appliance, Method for Operating Same, and System for Voice Recognition Using Same'

The following discussion of related art is provided to assist the reader in understanding the advantages of the present disclosure, and is not to be construed as an admission that this related art is prior art to the present disclosure.

In order to control the operations of electronic devices installed at home, a user directly controls the electronic devices or remotely controls the electronic devices by using a remote control or the like.

Recently, as communication technology develops, technology allowing users to operate electronic devices by inputting a voice command is being developed.

Accordingly, users can operate electronic devices by uttering a voice command, using a remote control, or through direct control of the electronic devices. However, there has been a difficulty in visually checking the operational state of the electronic devices.

For example, in order to visually check the temperature setting of an air conditioner, the user is required to check a display in a remote control or a setting window mounted on the main body of the air conditioner.

Similarly, in order to check the current operational state (e.g., remaining operation time) of a washing machine or a drying machine, for example, the user has to go to where the washing machine or the drying machine is located. Recently, a related technique has been developed in which, when the washing machine or the drying machine is connected to an application of a smart device, the user can check the current operational state of the washing machine or the drying machine through the smart device. However, it may be cumbersome for users to install a related application in a smart device and connect the installed application to an electronic device, in order to check the operational state of the electronic device.

Accordingly, there is a demand for a technique that allows users to visually check the operational state of an electronic device through a device installed indoors (e.g., a lighting), and to easily control the operation of the electronic device.

As a specific example of such a technique by which the operational state of an electronic device can be shown, related art 1 discloses an invention by which a user of an electronic device can remotely control, on a smart server, the operation of the electronic device at a home having a home network, after a requested operation of the electronic device finishes.

In detail, related art 1 discloses a technique by which when the operation of a washing machine among home appliances finishes, a smart server by itself performs communications necessary for controlling the operation of the washing machine. According to related art 1, the user can visually check the operational state of the electronic device through a device installed indoors. However, related art 1 does not specifically disclose a technique that allows easier control of the operation of the electronic device.

Related art 2 suggests a technique of improving the voice recognition rate such that the operation of an electronic device can be accurately controlled by user's voice.

Related art 2 describes that a user can control an operation of a smart home appliance through voice. In addition, a user's face or an action for manipulating a mobile device is recognized, and through this, it can be determined whether the user has an intention for speaking a voice command, such that voice misrecognition is prevented, and the voice can be more accurately recognized.

Related art 2 suggests a technique by which the operation of an electronic device can be controlled by the user's voice, but does not specifically disclose a technique that allows the user to visually check the current operational state of the electronic device through a device installed indoors.

Accordingly, a technique is required by which an electronic device is coupled to a device installed indoors, such as a lighting, so that the user can see the current operational state of the electronic device through the device installed indoors by uttering a voice or using a remote control.

The description in this section is technical information that was retained by the inventor in order to derive the present disclosure or was acquired by the inventor in the process of deriving the present disclosure. Therefore, the description in this section is not necessarily a known technology opened to the general public before the filing of the present application.

SUMMARY OF THE INVENTION

An aspect of the present disclosure is directed to providing a device installed indoors, through which a user can visually check and recognize in real-time the current operational state of an electronic device.

Another aspect of the present disclosure is directed to providing a device through which a user can recognize current operational states of a plurality of electronic devices at once.

Yet another aspect of the present disclosure is directed to improving user convenience in using an electronic device.

Yet another aspect of the present disclosure is directed to providing a device through which current operational information and control information of an electronic device are visually shown to a user when requested, while minimizing the use of a user device, a wearable device, and the like.

Aspects of the present disclosure is not limited to those mentioned above, and other aspects and advantages of the present disclosure, aside from those mentioned above, will be understood with reference to the following description, and will be more apparent with reference to the embodiments of the present disclosure described below. In addition, it will be understood that the aspects and advantages of the present disclosure can be realized by the means of the claims and combinations thereof.

A lighting control server according to an exemplary embodiment of the present disclosure relates to a technique by which the operation of a smart lighting installed indoors may be controlled such that operational information of an electronic device installed indoors can be shown through the smart lighting.

Specifically, according to an exemplary embodiment of the present disclosure, a lighting control server may include an input interface configured to receive information of an operation of an electronic device communicating with the lighting control server, a memory in which is stored a matching table used to match an operation of the electronic device to an operation that can be performed by the smart lighting, and a transmitter configured to transmit, to the smart lighting, information of an operation of the smart lighting that is matched to the operation of the electronic device on the basis of the matching table.

Such a server that controls the smart lighting may serve as a hub capable of controlling the operation of the smart lighting.

In addition, the input interface of the lighting control server according to this embodiment of the present disclosure may include at least one of a voice input interface configured to receive a user's voice, or a controller which communicates with the electronic device and includes a plurality of buttons for selecting operations of the electronic device.

That is, in order to control the operation of the electronic device, a control command may be generated by the user's voice. In addition, a control command may also be generated through a user terminal and a remote control. Accordingly, a control command for controlling the electronic device may be inputted in various ways.

In addition, the input interface of the lighting control server according to this embodiment of the present disclosure may receive at least one control command selected from the group of a command for controlling an on/off operation of the electronic device, a command for checking remaining operation time of the electronic device, and a command for controlling a performable operation of the electronic device.

That is, since various control commands for controlling the electronic device may be inputted, the user may check various operational information of the electronic device through the smart lighting.

In addition, according to this embodiment of the present disclosure, the operation of the smart lighting that is matched to the operation of the electronic device may include at least one selected from the group of a change in color or brightness of the smart lighting in accordance with the on/off operation of the electronic device, a change in color or brightness of a part of the smart lighting corresponding to a position at which the electronic device is operating, a change in color or brightness in each section of the smart lighting in accordance with remaining operation time of the electronic device, and a display, on the smart lighting, of remaining operation time of the electronic device.

That is, information of the operation of the smart lighting corresponding to the control command for the electronic device generated by the user may be transmitted to the smart lighting.

According to this embodiment of the present disclosure, the smart lighting may include a first lighting and a second lighting. In addition, the transmitter of the lighting control server may include a first transmitter configured to transmit, to the first lighting, information of an operation of the smart lighting corresponding to information of an operation of any one electronic device disposed indoors, and a second transmitter configured to transmit, to the second lighting, information of an operation of the smart lighting corresponding to information of an operation of another electronic device disposed indoors.

Accordingly, the user may check current operational information of a plurality of electronic devices provided indoors, all at once.

According to an exemplary embodiment of the present disclosure, a smart lighting coupled to an electronic device may include a lighting-side receiver configured to receive information of an operation of an electronic device, a lighting-side memory storing therein a matching table used to match an operation of the electronic device to an operation of the smart lighting, and a lighting-side controller configured to control the smart lighting such that an operation of the smart lighting that is matched to the operation of the electronic device on the basis of the matching table is performed.

That is, the smart lighting may receive the information of the operation of the smart lighting transmitted from the lighting control server, to thereby control the operation of the smart lighting.

According to this embodiment of the present disclosure, the lighting-side receiver of the smart lighting coupled to an electronic device may include a first receiver configured to receive information of an operation of any one electronic device disposed indoors, and a second receiver configured to receive information of an operation of another electronic device disposed indoors.

That is, the smart lighting may receive information of control commands for a plurality of electronic devices disposed indoors.

According to this embodiment of the present disclosure, the lighting-side receiver of the smart lighting coupled to an electronic device may receive position information of the electronic device.

In detail, as the smart lighting receives information of the position of the electronic device, the smart lighting may be controlled such that a part of the smart lighting that corresponds to the position of the electronic device is operated. Accordingly, the operation of the electronic device may be shown in a specific part of the smart lighting corresponding to the position of electronic device, to thereby improve user convenience in checking the operation of the electronic device.

According to this embodiment of the present disclosure, the operation of the smart lighting that is matched to the operation of the electronic device may include at least one selected from the group of a change in color or brightness of the smart lighting in accordance with an on/off operation of the electronic device, a change in color or brightness of a part of the smart lighting corresponding to a position at which the electronic device is operating, a change in color or brightness in each section of the smart lighting in accordance with remaining operation time of the electronic device, and a display, on the smart lighting, of remaining operation time of the electronic device.

That is, the operation of the smart lighting may be controlled such that the operation of the smart lighting corresponds to the control command for the electronic device generated by the user.

According to this embodiment of the present disclosure, the lighting-side controller may control the operation of the smart lighting such that the brightness of the smart lighting is gradually reduced or increased in accordance with the operation of the electronic device.

Accordingly, the user may check in real-time an operational change of the electronic device over time.

According to an exemplary embodiment of the present disclosure, an electronic device may include an electronic device-side receiver configured to receive a control command for an operation of the electronic device, an electronic device-side memory which stores therein a matching table used to match an operation of the electronic device to an operation that can be performed by the smart lighting, and an electronic device-side transmitter configured to transmit, to the smart lighting, information of an operation of the smart lighting that is matched to the operation of the electronic device on the basis of the matching table.

Accordingly, the operation of the smart lighting may be controlled such that the operational information of the electronic device disposed indoors is shown through the smart lighting disposed indoors.

According to this embodiment of the present disclosure, the electronic device-side receiver of the electronic device may include at least one of an electronic device-side voice input interface configured to receive a user's voice, or an electronic device-side controller including a plurality of buttons for selecting operations of the electronic device.

That is, control commands for controlling the electronic device may be inputted to the electronic device-side receiver in various ways.

According to this embodiment of the present disclosure, the electronic device-side receiver of the electronic device may receive at least one control command selected from the group of a command for controlling an on/off operation of the electronic device, a command for checking remaining operation time of the electronic device, and a command for controlling a performable operation of the electronic device.

That is, since various control commands for the electronic device may be inputted, various operational information of the electronic device may be checked through the smart lighting.

According to this embodiment of the present disclosure, the operation of the smart lighting that is matched to the operation of the electronic device may include at least one selected from the group of a change in color or brightness of the smart lighting in accordance with an on/off operation of the electronic device, a change in color or brightness of a part of the smart lighting corresponding to a position at which the electronic device is operating, a change in color or brightness in each section of the smart lighting in accordance with remaining operation time of the electronic device, and a display, on the smart lighting, of remaining operation time of the electronic device.

That is, information of the operation of the smart lighting corresponding to the control command for the electronic device generated by the user may be transmitted to the smart lighting.

According to this embodiment of the present disclosure, the smart lighting may include a plurality of lightings. In addition, the electronic device-side receiver may receive information of one or more lightings that are in an on-state among the plurality of lightings, and the electronic device-side transmitter may transmit, to at least one of the one or more lightings that are in the on-state, information of the operation of the smart lighting matched to the operation of the electronic device.

That is, even without an additional lighting being turned on, the operational information of the electronic device may be transmitted to a smart lighting that is operable or a smart lighting that is currently in operation, such that the operational information of the electronic device is shown in the smart lighting.

According to an exemplary embodiment of the present disclosure, an operation method of a lighting control server may include receiving information of an operation of an electronic device communicating with the lighting control server, matching the operation of the electronic device to an operation that can be performed by a smart lighting, transmitting, to the smart lighting, information of the operation of the smart lighting matched to the operation of the electronic device, and controlling the operation of the smart lighting on the basis of the transmitted information of the operation of the smart lighting.

Accordingly, the operation of the smart lighting disposed indoors may be controlled such that the operational information of the electronic device disposed indoors is shown through the smart lighting.

According to this embodiment of the present disclosure, receiving the information may include any one of receiving a user's voice, or receiving a control command of the user corresponding to the operation of the electronic device through a controller communicating with the electronic device.

That is, as an operation that can be performed by the smart lighting corresponding to the control command for the electronic device generated by the user is matched, the operational state of the electronic device may be more accurately shown through the smart lighting.

According to this embodiment of the present disclosure, receiving the information may include at least one selected from the group of inputting, by the user, a command for controlling an on/off operation of the electronic device, inputting, by the user, a command for checking remaining operation time of the electronic device, and inputting, by the user, a command for controlling a performable operation of the electronic device.

That is, since various control commands for the electronic device may be inputted, various operational information of the electronic device may be checked through the smart lighting.

According to this embodiment of the present disclosure, the smart lighting may include a first lighting and a second lighting. In addition, transmitting the information may include transmitting, to the first lighting, information of an operation of any one electronic device disposed indoors, and transmitting, to the second lighting, information of an operation of another electronic device disposed indoors.

Accordingly, a user may check the operational information of the plurality of electronic devices disposed indoors, at once.

That is, control commands for the operations of the plurality of electronic devices disposed indoors may be received, and at the same time, the information of the operations of the plurality of electronic devices may be shown through the smart lighting.

In addition, according to the lighting control server comprising, an input interface configured to receive information, via a communication from an electronic device, wherein the information is for an operation of the electronic device, a memory configured to store a matching table, wherein the matching table includes data matching the operation of the electronic device to a corresponding operation for the smart lighting and a transmitter configured to transmit, to the smart lighting, information for the operation of the smart lighting that is matches to the corresponding operation of the electronic device, based on the data of the matching table.

In addition, according to smart lighting, a receiver configured to receive information relating to an operation of an electronic device, a memory configured to store a matching table, wherein the matching table includes data matching the received information relating to the operation of the electronic device to a corresponding operation for the smart lighting and a controller configured to control the smart lighting based on the received information that matches to the corresponding operation of the smart lighting, based on the data of the matching table.

According to the electronic device comprising, a receiver configured to receive a control command for an operation of the electronic device, a memory configured to store a matching table, wherein the matching table includes data matching the operation of the electronic device to a corresponding operation for the smart lighting and a transmitter configured to transmit, to the smart lighting, information for operation of the smart lighting that matches to the corresponding operation of the electronic device, based on the data of the matching table.

In addition, according to a lighting control server, receiving information, via a communication from an electronic device, wherein the information is for an operation of the electronic device, matching the operation of the electronic device to a corresponding operation for smart lighting and transmitting, to the smart lighting, information to cause operation of the smart lighting based on the operation of the smart lighting that matches to the corresponding operation of the electronic device.

Other aspects, features, and advantages of the present disclosure, aside from those mentioned above, will be more apparent with reference to the following drawings, claims, and detailed description.

According to the present disclosure, a user who wants to control an electronic device may visually check whether a control command inputted by the user has been accurately performed, since the information of the operation of the electronic device corresponding to the control command is shown in a smart lighting.

In addition, since the information of the operation of the electronic device is shown in the smart lighting, the user may check in real-time whether the electronic device is accurately performing the operation corresponding to the control command inputted by the user.

Meanwhile, the smart lighting according to an exemplary embodiment of the present disclosure may display operational information of various electronic devices at once. Accordingly, the user may not only control a plurality of electronic devices disposed indoors at the same time, but may also check the operational states of the plurality of electronic devices at the same time.

Effects of the present disclosure are not limited to those mentioned above, and other effects that are not mentioned above will be more clearly understood by those skilled in the art with reference to the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is an exemplary view illustrating a smart lighting environment including a user, a user terminal, a remote control, an electronic device, and a lighting control server connecting the user, the user terminal, the remote control, and the electronic device to one another, according to an exemplary embodiment of the present disclosure.

FIG. 2 is an exemplary view specifically illustrating the smart lighting environment of FIG. 1.

FIG. 3 is a schematic block diagram illustrating a lighting control server of a smart lighting according to an exemplary embodiment of the present disclosure.

FIG. 4 is a schematic block diagram illustrating a smart lighting according to an exemplary embodiment of the present disclosure.

FIG. 5 is a schematic block diagram illustrating an electronic device according to an exemplary embodiment of the present disclosure.

FIG. 6 is an exemplary view illustrating a first embodiment in which the operational state of an electronic device is shown through a smart lighting according to an exemplary embodiment of the present disclosure.

FIG. 7 is an exemplary view illustrating a second embodiment in which the operational state of an electronic device is shown through a smart lighting according to an exemplary embodiment of the present disclosure.

FIG. 8 is an exemplary view illustrating a third embodiment in which the operational state of an electronic device is shown through a smart lighting according to an exemplary embodiment of the present disclosure.

FIG. 9 is a flow chart illustrating a smart lighting control method according to an exemplary embodiment of the present disclosure.

FIG. 10 is a schematic flow chart illustrating a smart lighting control method according to an exemplary embodiment of the present disclosure.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of:" For example, the expression "at least one of A, B, and C" may also include an nth member, where n is greater than 3, whereas the expression "at least one selected from the group consisting of A, B, and C" does not.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processor (CPU) or application processor (AP)) for performing corresponding operations by executing at least one software program stored in a memory device.

Hereinafter, a smart lighting of the present disclosure will be described in detail with reference to the accompanying drawings.

FIG. 1 is an exemplary view illustrating a smart lighting environment including a user, a user terminal, a remote control, an electronic device, and a lighting control server connecting the user, the user terminal, the remote control, and the electronic device to one another, according to an exemplary embodiment of the present disclosure, and FIG. 2 is an exemplary view specifically illustrating the smart lighting environment of FIG. 1.

With reference to FIG. 1 and FIG. 2, a user 10a, a user terminal 10b, a remote control 10c, and an electronic device 300 are connected by a lighting control server 200. Here, at least one of the user terminal 10b or the remote control 10c, which is personal communication device, may include a communicator. Accordingly, the user terminal 10b and the remote control 10c may transmit and receive data. In addition, the electronic device 300 may be a plurality of electronic devices including, for example, a robot cleaner 300a, a washing machine 300b, an air conditioner 300c, and a refrigerator 300d.

The user 10a, the user terminal 10b, the remote control 10c, the electronic device 300, and the lighting control server 200 may be connected to one another in a 5G communication environment. In addition to the electronic devices illustrated in FIG. 1, various other electronic devices used at a home or an office may be connected and operated in an Internet of Things (IoT) environment.

The user 10a may utter a control command for the electronic device 300 through voice. The lighting control server 200 may include an artificial intelligence (AI) speaker, such that the voice uttered by the user 10a can be inputted therethrough. Accordingly, the lighting control server 200 may serve as a hub configured to control electronic devices having no voice input/output function (e.g., a washing machine and an air conditioner).

Here, the voice uttered by the user 10a may include, for example, a command for operating the electronic device 300 and a command for checking the operational state of the electronic device 300. The command for operating the electronic device 300 may be, for example, a command for controlling an on/off operation of the electronic device 300. The command for checking the operational state of the electronic device 300 may be a command for checking remaining operation time of the electronic device 300 while the electronic device 300 is in operation, or a command for changing a setting of the electronic device 300 (e.g., the fan speed of the air conditioner, the wind direction of the air conditioner, and the like). The command for operating the electronic device 300 and the command for checking the operational state of electronic device 300 may be stored in a memory 14 of FIG. 3.

In addition, the command for operating the electronic device 300 and the command for checking the operational state of the electronic device 300 may be generated not only by the voice of the user 10a but also through the user terminal 10b or the remote control 10c configured to control the electronic device 300. To this end, the user terminal 10b and the remote control 10c may be coupled to the electronic device 300.

In detail, when the user 10a wants to raise the room temperature, the user 10a may input a command of "Raise the room temperature" through an application of the user terminal 10b, and then the command of "Raise the room temperature" may be received by the lighting control server 200. Thereafter, the set temperature of the air conditioner 300c among the electronic devices 300 may be increased, and the operational state (e.g., the temperature, the fan speed, and the wind direction) of the air conditioner 300c may be shown through a smart lighting 100 (see FIG. 6).

Here, the user terminal 10b may include a communication terminal capable of performing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. In addition, the user terminal 10b may be a wearable terminal having a communication function and a data processing function, such as a wearable watch, wearable glasses or goggles, a wearable hairband, a wearable ring, and the like. The user terminal 10b is not limited to the aforementioned items, but may be any terminal capable of web-browsing.

Similarly, when the user 10a wants to raise the set temperature of the air conditioner 300c by using the remote control 10c, the user 10a may input a control command by pressing a temperature control button in the remote control 10c. The inputted control command then may be transmitted to the lighting control server 200, and then the set temperature of the air conditioner 300c may be increased on the basis of the transmitted control command, to thereby control the operation of the air conditioner 300c. Here, the change in the set temperature of the air conditioner 300c may be shown through the smart lighting 100, such that the controlled operation of the air conditioner 300c may be visually checked by the user 10a. Accordingly, the user 10a may check the controlled operation of the electronic device 300 through the smart lighting 100 installed indoors.

Here, the remote control 10c may be a remote control capable of remotely controlling the electronic device 300, and apart from such a remote control, may be any device capable of remotely controlling the electronic device 300.

The lighting control server 200 may be a database server providing big data required for the application of various artificial intelligence algorithms and data related to voice recognition. The lighting control server 200 may include a web server or an application server which enables remote control of the voice of the user 10a, the user terminal 10b, and the remote control 10c, by using an application or a web browser installed in the user terminal 10b.

Artificial intelligence (AI) is an area of computer engineering and information technology that studies how to make computers perform things that humans are capable of doing with human intelligence, such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

In detail, the lighting control server 200 may receive a control command for an operation of the electronic device 300 generated by the voice of the user 10a or through the user terminal 10b or the remote control 10c, and then may match the operation of the electronic device 300 corresponding to the received control command to an operation that can be performed by the smart lighting 100. Here, the operation that can be performed by the smart lighting 100 matched to the operation of the electronic device 300 may be, for example, displaying the remaining operation time of the electronic device 300 on the smart lighting 100, or showing the setting of the electronic device 300 (e.g., the fan speed of the air conditioner and the wind direction of the air conditioner) through the smart lighting 100. That is, the lighting control server 200 may control the operations to be performed by the smart lighting 100.

Furthermore, the lighting control server 200 may perform a role of connecting the user 10a, the user terminal 10b, and the remote control 10c with the electronic device 300. To this end, the lighting control server 200 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The lighting control server 200 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

Furthermore, the lighting control server 200 may include connections of network elements, such as hubs, bridges, routers, switches, and gateways. In detail, the lighting control server 200 may include one or more connected networks, including a public network such as the Internet and a private network such as a secure corporate private network. For example, the lighting control server 200 may include a multi-network environment. Access to the lighting control server 200 may be provided through one or more wire-based or wireless access networks. Further, the lighting control server 200 may support a 5G communication and/or an Internet of things (IoT) network for exchanging and processing information between distributed components such as objects.

FIG. 3 is a schematic block diagram illustrating a smart lighting server according to an exemplary embodiment of the present disclosure. Description that overlaps with that of FIG. 1 and FIG. 2 will be omitted.

With reference to FIG. 3, a lighting control server 200 may include a communicator 11, an input interface 12, a memory 14, a voice processor 16, and a transmitter 18.

The communicator 11 may be coupled to the user terminal 10b and the remote control 10c, and provide a communication interface required to provide, in the form of packet data, a signal of a control command for the electronic device 300 that has been inputted to the user terminal 10b and the remote control 10c. In addition, the communicator 11 may perform a role of receiving an information request signal from the electronic device 300 and/or the user terminal 10b and the remote control 10c. In addition, the communicator 11 may perform a role of processing the voice uttered by the user 10a and then transmitting the processed voice to the electronic device 300. Furthermore, the communicator 11 may be a device including hardware and software required for transmitting and receiving a signal such as a control signal or a data signal through wired/wireless connections to another electronic device.

In this embodiment, said another electronic device may include home appliances that do not have a voice input/output function, such as the air conditioner 300c, the refrigerator 300d, and the washing machine 300b. Alternatively, said other electronic device may be a device having a voice input/output function.

The input interface 12 may include a voice input interface 12a and a controller 12b, and receive information of an operation of the electronic device 300 inputted through the voice of the user 10a or via the user terminal 10b or the remote control 10c. For example, when the user 10a utters a control command for an operation of the electronic device 300, the control command for the operation of the electronic device 300 may be inputted through the voice input interface 12a. When the information of the operation of the electronic device 300 is inputted via the user terminal 10b or the remote control 10c, the control command for the electronic device 300 may be inputted through the controller 12b.

To this end, the voice input interface 12a may include at least one microphone (not illustrated). In addition, in order to more accurately receive the voice of the user 10a, the voice input interface 12a may include a plurality of microphones (not illustrated). Here, the plurality of microphones may be disposed to be spaced apart from each other at different positions indoors, and may process a voice signal of the user 10a into an electrical signal.

Furthermore, the voice input interface 12a may use various noise removal algorithms in order to remove noise that is generated in the process of receiving the voice of the user 10a. In addition, the voice input interface 12a may include various elements configured to process an audio signal, such as a filter (not illustrated) configured to remove noise when a spoken utterance of the user 10a is received, and an amplifier (not illustrated) configured to amplify a signal outputted from the filter and then output the amplified signal.

The input interface 12 may receive any one control command from among a command for controlling an on/off operation of the electronic device 300, a command for checking remaining operation time of the electronic device 300, and a command for performing an operation of the electronic device 300.

The voice processor 16 may convert a voice signal of the user 10a received through the voice input interface 12a into text, and then from the converted text, extract at least one control command word for the electronic device 300. The voice processor 16 may select any one word from among the extracted at least one control command word, on the basis of pre-stored words. When any one word is selected, the controller 19 may execute the at least one control command word processed in the voice processor 16 as a control command capable of controlling an operation of the electronic device 300. Then, information of the operation of the electronic device 300 may be shown in the smart lighting 100.

The memory 14 may store therein a matching table used to match an operation of the electronic device 300 to an operation that can be performed by the smart lighting 100. In detail, the matching table may be a learning table for, when a control command for an operation of the electronic device 300 is received through the input interface 12, matching the operation of the electronic device 300 to an operation of the smart lighting 100. For example, when the user utters "Lower the room temperature," "room temperature" may be words for selecting the air conditioner 300c from among a plurality of electronic devices 300, and "lower" may be a command word for controlling the operation of the air conditioner 300c. Here, when the user utters "Lower the room temperature," the operational setting of the air conditioner 300c may be changed, and the changed operational setting may be shown in the smart lighting 100. Here, the matching table may be a data set inputted into a machine learning model. On the basis of pre-taught content of the matching table, an electronic device corresponding to "room temperature" (e.g., the air conditioner) may be matched, and when the electronic device is matched, the operational setting of the electronic device corresponding to "lower" (for example, the set temperature of the air conditioner or the on/off operation of the air conditioner) may be changed.

In addition, the memory 14 may include a volatile or non-volatile recording medium, and record therein various information required for the operation of the server 200, in addition to the matching table. The recording medium may be configured to store data readable by the controller 19, and may include a hard disk drive (HDD), a solid state disk (SSD), a silicon disk drive (SDD), a ROM, a RAM, a CD-ROM, a magnetic tape, a floppy disk, a light data storage device, and the like.

In addition, the memory 14 may store therein limited data. For example, the memory 14 may store therein preset words for extracting a control command from the spoken voice of the user. For example, in the spoken sentence of "Lower the room temperature," "room temperature" may be set as words for matching an electronic device 300, and "lower" may be set as a word for changing the operational setting of the electronic device 300 (for example, the set temperature of the air conditioner or the on/off operation of the air conditioner). In addition, as described above, such a control command may be preset by the machine learning model, but alternatively, the setting may be changed by the user.

When the operation of the electronic device 300 is matched to an operation that can be performed by the smart lighting 100 on the basis of the matching table, information of the operation of the smart lighting 100 matched to the operation of the electronic device 300 may be transmitted to the smart lighting 100 through the transmitter 18.

Here, the operation of the smart lighting 100 matched to the operation of the electronic device 300 may include a change in color or brightness of the smart lighting in accordance with the on/off operation of the electronic device, a change in color or brightness of a part of the smart lighting corresponding to a position at which the electronic device is operating, a change in color or brightness in each section of the smart lighting in accordance with remaining operation time of the electronic device, and a display, on the smart lighting, of remaining operation time of the electronic device.

The transmitter 18 is a feature configured to transmit the information of the operation of the smart lighting 100 matched to the operation of the electronic device 300 on the basis of the matching table. In detail, when a control command is received by the input interface 12, the transmitter 18 may transmit, to the smart lighting 100, the information of an on/off operation of the electronic device 300 or the information of remaining operation time of the electronic device 300.

Here, the transmitter 18 may be a plurality of transmitters 18, in order to transmit operational information of a plurality of electronic devices 300 to the smart lighting 100. In detail, the transmitter 18 may include a first transmitter 18a configured to transmit operational information of any one electronic device disposed indoors to the smart lighting 100, and a second transmitter 18b configured to transmit operational information of another electronic device disposed indoors to the smart lighting 100.

For example, the input interface 12 may receive control commands of the user for the air conditioner 300c and the washing machine 300b at home. In detail, the user who recognizes that the washing machine 300b is in operation may transmit, to the input interface 12, a control command for checking the remaining operation time of the washing machine 300b, and a control command for increasing the room temperature. Then, according to the received control command, the memory 14 may match an operation of the smart lighting 100 corresponding to the remaining operation time of the washing machine 300b. In this embodiment, the matching may be performed on the basis of the matching table, so that the remaining operation time of the washing machine 300b may be displayed on the smart lighting 100 as a number (for example, 47 minutes). In addition, the matching may be performed on the basis of the matching table, so that the controlled operation of the air conditioner 300c, such as an increase of the set temperature of the air conditioner 300c for increasing the room temperature, or a stop of the operation of the air conditioner 300c, may be shown in the smart lighting 100. For example, when the set temperature of the air conditioner 300c is increased, a red light in the smart lighting 100 may be turned on.

To this end, the smart lighting 100 may include a plurality of smart lightings corresponding to the plurality of transmitters 18. For example, the smart lighting 100 may be any one of lightings installed around an indoor main lighting. In this embodiment, two smart lightings meeting each other at one edge forming 90 degrees will be described as an example.

The controller 19 may process a control command of the user received by the input interface 12 into a control command signal to be transmitted from the transmitter 18 to the smart lighting 100. The controller 19, as a central processor, may provide various functions including operating control software installed in the memory 14, controlling the transmitter 18, and transmitting a control command to the smart lighting 100. In this embodiment, the controller 19 may include all kinds of devices that can process data, such as a processor. Here, the "processor" may refer to a data processing device built in a hardware, which includes physically structured circuits in order to perform functions represented as a code or command present in a program. Examples of the data processing device built in a hardware include, but are not limited to, processing devices such as a microprocessor, a central processor (CPU), a processor core, a multiprocessor, an application-specific integrated circuit (ASIC), a field programmable gate array (FPGA), and the like.

In this embodiment, the lighting control server 200 may perform machine learning, such as a deep learning, for the control command for the electronic device 300 generated by the user. To this end, the memory 14 may store therein result data used for the machine learning.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

In addition, the lighting control server 200 may be provided with an artificial neural network, and perform machine learning-based user recognition and user's voice tone recognition by using received audio input signals as input data.

To this end, the controller 19 may include a deep neural network (DNN) and train the DNN, and examples of the DNN include CNN, RNN, DBN, and so forth. As a machine learning method for such an artificial neural network, both unsupervised learning and supervised learning may be used. The controller 19 may be controlled so as to learn according to a setting and update a structure of the voice tone recognition artificial neural network.

FIG. 4 is a schematic block diagram illustrating a smart lighting according to an exemplary embodiment of the present disclosure. Description that overlaps with that of FIG. 1 to FIG. 3 will be omitted.

With reference to FIG. 4, the smart lighting 100 according to an exemplary embodiment of the present disclosure may include a lighting-side communicator 120, a lighting-side receiver 140, a lighting-side memory 160, an output interface 180, and a lighting-side controller 190.

The lighting-side communicator 120 may include a communication interface capable of receiving a signal of a control command for the electronic device 300 generated in the lighting control server 200. In addition, the lighting-side communicator 120 may be a device including hardware and software required for transmitting and receiving a signal such as a control signal or a data signal through wired/wireless connections to a plurality of electronic devices disposed indoors.

The lighting-side receiver 140 may receive information of an operation of the electronic device 300. In detail, the lighting-side receiver 140 may be a device configured to receive information of a control command for the electronic device 300 transmitted from the transmitter 18 of the lighting control server 200.

The lighting-side receiver 140 may include a plurality of receivers configured to receive information of a plurality of control commands for a plurality of electronic devices 300 transmitted from the transmitter 18 of the lighting control server 200. According to an aforementioned embodiment, the user may input control commands for the air conditioner 300c and the washing machine 300b at home through the input interface 12. In detail, the user may input the control commands for the electronic devices 300 to the lighting control server 200, by speaking "Remaining operation time of the washing machine" for checking the remaining operation time of the washing machine 300b, and by speaking "Lower the room temperature" for changing the set temperature of the air conditioner 300c. Here, the lighting-side receiver 140 may include a first receiver 140a and a second receiver 140b, wherein on the basis of the inputted information of the control commands, the first receiver 140a may receive information of the remaining operation time of the washing machine 300b, and the second receiver 140b may receive information of the operational setting of the air conditioner 300c. In this embodiment, the first receiver 140a and the second receiver 140b are described as examples, but the lighting-side receiver 140 may include more than two receivers, depending on the situation.

In addition, the lighting-side receiver 140 may receive position information of the electronic device 300. In detail, as the lighting-side receiver 140 receives information of position of the electronic device 300, the smart lighting 100 may be controlled such that a part of the smart lighting 100 that corresponds to the position of the electronic device 300 is operated. Accordingly, information of the operation of the electronic device 300 may be shown in a specific part of the smart lighting 100 corresponding to the position of electronic device 300, to thereby improve user convenience in checking the operation of the electronic device 300.

When the lighting-side receiver 140 receives information of a control command for an operation of the electronic device 300, an operation of the smart lighting 100 may be matched to the operation of the electronic device 300 corresponding to the received information of the control command. To this end, the lighting-side memory 160 may store therein a matching table.

As described above, the memory 14 of the lighting control server 200 may store therein the matching table for, when a control command for an operation of the electronic device 300 is inputted through the input interface 12, matching the operation of the electronic device 300 to an operation of the smart lighting 100. Similarly, the lighting-side memory 160 may also store therein a matching table used to match an operation of the smart lighting 100 to the operation of the electronic device 300 corresponding to the inputted control command.

Since an operation of the smart lighting 100 is matched to the operation of the electronic device 300 corresponding to the inputted control command by using the memory 14 of the lighting control server 200, this embodiment will describe an example in which no further matching process is performed by the lighting-side memory 160 of the smart lighting 100.

However, if the lighting-side memory 160 performs an additional process of matching an operation of the smart lighting 100 to the operation of the electronic device 300 corresponding to the inputted control command, the operation of the smart lighting 100 may be more accurately derived.

The lighting-side controller 190 may control the operation of the smart lighting 100 to correspond to the operation of the electronic device 300 on the basis of the matching table stored in the lighting-side memory 160 and/or in the memory 14 of the lighting control server 200.

In detail, when the user utters "Lower the room temperature," the operational setting of the air conditioner 300c may be changed. Here, the lighting-side controller 190 may control the operation of the smart lighting 100 such that the changed operational setting of the air conditioner 300c is shown in the smart lighting 100.

In detail, when the user utters "Lower the room temperature," the lowered set temperature of the air conditioner 300c may be shown in the smart lighting 100. For example, a red light in the smart lighting 100 may be turned on, or the lowered set temperature of the air conditioner 300c (e.g., 20° C.) may be directly displayed on the smart lighting 100.

In an alternative embodiment, the user may utter a control command requesting a change of the wind direction of the air conditioner 300c. Then, the operation of the air conditioner 300c may be controlled such that the wind direction of the air conditioner 300c is changed. Then, the changed operation of the air conditioner 300c may be shown in the smart lighting 100. For example, when the user utters a control command for changing the wind direction of the air conditioner 300c such that the outlet of the air conditioner 300c out of which the wind is coming is changed from a first air outlet (320a of FIG. 6) to a second air outlet (320b of FIG. 6), the lighting-side controller 190 may control the operation of the smart lighting 100 such that a first smart lighting (100a of FIG. 6) of the smart lighting 100 is turned off, and a second smart lighting (100b of FIG. 6) of the smart lighting 100 is turned on.

In an alternative embodiment, when the user inputs a control command for checking remaining operation time of the washing machine through the user terminal 10b or the remote control 10c, the lighting control server 200 may receive operational history of the washing machine 300b. The inputted operational history of the washing machine 300b may be the remaining operation time of the washing machine 300b, which is calculated on the basis of a pre-inputted washing time of the washing machine 300b. When a control command for checking the remaining operation time of the washing machine is generated in such a way, the lighting-side controller 190 may control the smart lighting 100 such that the remaining operation time of the washing machine 300b is directly displayed on the smart lighting 100, or such that the smart lighting 100 gradually dims depending on the remaining operation time. Here, it can be assumed that the time point when the smart lighting 100 is turned on in full brightness is the start time of the operation of the washing machine 300b, and the smart lighting 100 may be set such that as the end of the operation of the washing machine 300b approaches, the smart lighting 100 gradually dims.

That is, the lighting-side controller 190 may control the operation of the smart lighting 100, such that the smart lighting 100 shows the on/off operation of the electronic device 300, shows the remaining operation time of the electronic device 300 with the brightness of the smart lighting 100, or directly displays the remaining operation time of the electronic device 300.

In detail, the lighting-side controller 190 may control a change in color or brightness of the smart lighting 100 in accordance with the on/off operation of the electronic device 300, a change in color or brightness of a part of the smart lighting 100 corresponding to a position at which the electronic device is operating, a change in color or brightness in each section of the smart lighting 100 in accordance with remaining operation time of the electronic device 300, and a display, on the smart lighting 100, of remaining operation time of the electronic device 300.

When the lighting-side controller 190 controls the operation of the smart lighting 100, the information of the operation of the electronic device 300 may be shown in the smart lighting 100 by using the output interface 180.

The information of the operation of the electronic device 300 may be shown in the smart lighting 100, through operations of the smart lighting 100, such as flickering, turning on the lighting, and turning off the lighting. Alternatively, the information of the operation of the electronic device 300 may be directly displayed on the smart lighting 100. Furthermore, the information shown or displayed in the smart lighting 100 may be outputted in the form of sound.

FIG. 5 is a schematic block diagram illustrating an electronic device according to an exemplary embodiment of the present disclosure. Description that overlaps with that of FIG. 1 to FIG. 4 will be omitted.

Referring to FIG. 5, the electronic device 300 according to the embodiment of the present disclosure may include an electronic device-side communicator 320, an electronic device-side receiver 340, an electronic device-side memory 360, an electronic device-side transmitter 380, and an electronic device-side controller 390.

The electronic device-side communicator 320 may include an interface capable of receiving a signal of a control command for the electronic device 300, generated in the lighting control server 200. In addition, the electronic device-side communicator 320 may be a device including hardware and software required for transmitting and receiving a signal such as a control signal or a data signal through wired/wireless connections to a plurality of electronic devices disposed indoors.

The electronic device-side receiver 340 may receive information of an operation of the electronic device 300. In detail, the electronic device-side receiver 340 may be a device configured to receive information of a control command for an operation of the electronic device 300 transmitted from the transmitter 18 of the lighting control server 200.

The electronic device-side receiver 340 may include a plurality of receivers configured to receive information of a plurality of control commands for the electronic devices 300 transmitted from the transmitter 18 of the lighting control server 200. For example, the electronic device-side receiver 340 may include an electronic device-side voice input interface 340a configured to receive the user's voice, and an electronic device-side controller 340b including a plurality of buttons for selecting operations of the electronic device 300.

According to an aforementioned example, voice control commands of the user for the air conditioner 300c and the washing machine 300b may be received by the electronic device-side voice input interface 340a. In addition, the user may input control commands for the air conditioner 300c and the washing machine 300b to the electronic device-side controller 340b by pressing buttons thereof.

The electronic device-side receiver 340 may receive information of a control command for the electronic device 300. In detail, the electronic device-side receiver 340 may receive control commands for controlling an on/off operation of the electronic device 300, checking remaining operation time of the electronic device 300, and controlling a performable operation of the electronic device 300.

When information of the control command for an operation of the electronic device 300 is received through the electronic device-side receiver 340, the operation of the electronic device 300 according to the information of the control command may be matched to an operation of the smart lighting 100. To this end, the electronic device-side memory 360 may store therein a matching table.

The operation of the smart lighting 100 matched to the operation of the electronic device 300 on the basis of the matching table may be at least one selected from the group of a change in color or brightness of the smart lighting 100 in accordance with the on/off operation of the electronic device 300, a change in color or brightness of a part of the smart lighting 100 corresponding to a position at which the electronic device 300 is operating, a change in color or brightness in each section of the smart lighting 100 in accordance with remaining operation time of the electronic device 300, and a display, on the smart lighting 100, of remaining operation time of the electronic device 300.

As described above, the memory 14 of the lighting control server 200 may store therein a matching table for, when a control command for an operation of the electronic device 300 is inputted through the input interface 12, matching the operation of the electronic device 300 to an operation of the smart lighting 100. Similarly, the electronic device-side memory 360 may also store therein a matching table used to match an operation of the smart lighting 100 to the operation of the electronic device 300 corresponding to the inputted control command.

Since an operation of the smart lighting 100 is matched to the operation of the electronic device 300 corresponding to the inputted control command by using the memory 14 of the lighting control server 200, this embodiment will describe an example in which no further matching process is performed by the electronic device-side memory 360.

However, if the electronic device-side memory 360 performs an additional process of matching an operation of the smart lighting 100 to the operation of the electronic device 300 corresponding to the inputted control command, the operation of the smart lighting 100 may be more accurately derived.

Meanwhile, the smart lighting 100 may include a plurality of lightings. The electronic device-side receiver 340 may receive information of one or more lightings that are in an on-state from among the plurality of lightings, and the electronic device-side transmitter 380 may transmit, to the one or more lightings that are in the on-state among the plurality of lightings, information of the operation of the smart lighting 100 matched to the operation of the electronic device 300.

That is, since the operational information of the electronic device 300 may be transmitted to a smart lighting 100 that is operable or currently in operation, the operational information of the electronic device 300 is shown in the smart lighting 100, even without an additional lighting being turned on.

The electronic device-side controller 390 may control the operation of the smart lighting 100 to correspond to the operation of the electronic device 300 on the basis of the matching table stored in the electronic device-side memory 360 and/or the memory 14 of the lighting control server 200.

As described in a previous embodiment, when the user utters "Lower the room temperature," the operational setting of the air conditioner 300c may be changed. Here, the electronic device-side controller 390 may control the operation of the smart lighting 100 such that the changed operational setting of the air conditioner 300c is shown in the smart lighting 100.

That is, the electronic device-side controller 390 may control operations of the smart lighting 100, including a change in color or brightness of the smart lighting 100 in accordance with the on/off operation of the electronic device 300, a change in color or brightness of a part of the smart lighting corresponding to a position at which the electronic device is operating, a change in color or brightness in each section of the smart lighting 100 in accordance with remaining operation time of the electronic device 300, and a display, on the smart lighting 100, of remaining operation time of the electronic device 300.

As mentioned above, when the electronic device-side controller 390 controls the operation of the smart lighting 100, the operational information of the electronic device 300 according to the inputted control command may be shown in the smart lighting 100 by means of the electronic device-side transmitter 180.

The operational information of the electronic device 300 may be shown in the smart lighting 100, through operations of the smart lighting 100, such as flickering, turning on the lighting, and turning off the lighting. Alternatively, the operational information of the electronic device 300 may be directly displayed on the smart lighting 100. Furthermore, the operational information shown or displayed in the smart lighting 100 may be outputted in the form of sound.

FIG. 6 is an exemplary view illustrating a first embodiment in which the operational state of an electronic device is shown through a smart lighting according to an exemplary embodiment of the present disclosure. Hereinafter, description that overlaps with that of FIG. 1 to FIG. 5 will be omitted.

Referring to FIG. 6, the user 10a may generate a control command for the electronic device 300 through voice and/or the remote control 10b. For example, the control command may be "Lower the room temperature."

In accordance with the generated control command, the air conditioner 300c disposed indoors may be operated. Here, if the air conditioner 300c has been in an off state, an operation for turning on the air conditioner 300c may be performed. Here, the smart lighting 100 may show that the operation for turning on the air conditioner 300c is being performed. For example, the smart lighting 100 may flicker or be turned on to show that the air conditioner 300c is being turned on. Here, the color of the light turned on in the smart lighting 100 may vary depending on the setting thereof.

When the air conditioner 300c is turned on, the control command of "Lower the room temperature" generated by the user may be inputted into the input interface 12 of the lighting control server 200. Then, an operation to be performed by the air conditioner 300c (for example, a cooling operation) may be matched to an operation that can be performed by the smart lighting 100 on the basis of the matching table. For example, the operation to be performed by the air conditioner 300c may be matched to an operation of turning on a blue light in the smart lighting 100 on the basis of the matching table.

Then, the cooling operation of the air conditioner 300c may be performed, and at the same time, the lighting control server 200 may transmit information of the matched operation of the smart lighting 100 to the smart lighting 100 such that the blue light in the smart lighting 100 is turned on.

On the basis of the information of the matched operation of the smart lighting 100, the blue light of the smart lighting 100 may be turned on from when the cooling operation of the air conditioner 300c is started.

Thereafter, a control command for controlling an operation of the air conditioner 300c among the electronic devices 300 may be additionally generated by the user. For example, the user may generate a control command for restricting the cooling operation of the air conditioner 300c, such as "Raise the room temperature" and/or "It's too cold." Then, according to an operation of the smart lighting 100 that is matched to the restriction of the cooling operation of the air conditioner 300c on the basis of the matching table, the smart lighting 100 (for example, a red light in the smart lighting 100) may be turned on or turned off.

As another example, if the air conditioner 300c has two air outlets, the air conditioner 300c may be set by the user such that the temperature of the air coming from a first air outlet 320a is lowered, while the temperature of the air coming from a second air outlet 320b is maintained. Here, according to a default setting or a setting set by the user, the first air outlet 320a may be referred to as a right-side wing, and the second air outlet 320b may be referred to as a left-side wing. When such a setting is stored, the user may input a control command for accelerating the cooling operation in the first air outlet 320a only, by saying "Right wing cooling" or by using the remote control 10c.

Here, when the cooling operation is accelerated in the first air outlet 320a of the air conditioner 300c, then at the same time, a dark blue light in a first smart lighting 100a, which is disposed adjacent to the first air outlet 320a, may be turned on, such that the user can see that the cooling operation in the first air outlet 320a has been accelerated.

Since the smart lighting 100 visually shows the operational states of the electronic devices 300 disposed indoors according to control commands, the user may check in real-time whether the operation of the electronic devices 300 is being accurately performed.

FIG. 7 is an exemplary view illustrating a second embodiment in which the operational state of an electronic device is shown through a smart lighting according to an exemplary embodiment of the present disclosure. Hereinafter, description that overlaps with that of FIG. 1 to FIG. 6 will be omitted.

Referring to FIG. 7, the user 10a may generate a control command for the electronic device 300 through voice and/or the remote control 10b For example, the control command may be "Lower the room temperature," "Let me know the remaining operation time of the washing machine" and "Let me know the remaining operation time of the robot cleaner."

In accordance with the generated control command, the air conditioner 300c may be operated. Here, if the air conditioner 300c is in an off state, an operation for turning on the air conditioner 300c may be performed. Here, the smart lighting 100 may show that the operation for turning on the air conditioner 300c is being performed. For example, the smart lighting 100 may flicker or be turned on to show that the air conditioner 300c is being turned on. Here, the color of the light turned on in the smart lighting 100 may vary depending on the setting thereof.

When the air conditioner 300c is turned on, the control command of "Lower the room temperature" may be inputted into the input interface 12 of the lighting control server 200. Then, an operation to be performed by the air conditioner 300c (for example, a cooling operation) may be matched to an operation that can be performed by the smart lighting 100 on the basis of the matching table. For example, the operation to be performed by the air conditioner 300c may be matched to an operation of turning on a blue light in the smart lighting 100 on the basis of the matching table.

Then, the cooling operation of the air conditioner 300c may be performed, and at the same time, the lighting control server 200 may transmit information of the matched operation of the smart lighting 100 to the smart lighting 100 such that the blue light in the smart lighting 100 is turned on.

On the basis of the information of the matched operation of the smart lighting 100, the blue light in the smart lighting 100 may be turned on from when the cooling operation of the air conditioner 300c is started.

Meanwhile, when the user utters control commands of "Let me know the remaining operation time of the washing machine" for the washing machine 300b among the electronic devices 300, and "Let me know the remaining operation time of the robot cleaner" for the robot cleaner 300a among the electronic devices 300, related operational information of the electronic devices 300 corresponding to the control commands may be shown in parts of the first smart lighting 100a and a second smart lighting 100b.

In detail, the user who recognizes that the washing machine 300b is in operation may input a control command for checking remaining operation time of the washing machine 300b. Then, in accordance with the inputted control command, the remaining operation time of the washing machine 300b may be displayed on the first smart lighting 100a.

Similarly, the user who recognizes that the robot cleaner 300a is in operation may input a control command for checking remaining operation time of the robot cleaner 300a. Then, in accordance with the inputted control command, the remaining operation time of the robot cleaner 300a may be displayed on the second smart lighting 100b.

Here, the user may utter the control command for checking remaining operation time of the washing machine 300b almost simultaneously with operating the air conditioner 300c. However, it would generally be the case that the user utters the control command for checking remaining operation time of the washing machine 300b while the air conditioner 300c is already in operation. Accordingly, the smart lighting 100 according to this embodiment may be configured to show different operational information of a plurality of the electronic devices 300 at the same time. For example, the smart lighting 100 may show operational information of a first electronic device (for example, the air conditioner), and at the same time, may additionally show operational information of a second electronic device (for example, the washing machine).

As described above, a single smart lighting 100 may show the operational information of the plurality of the electronic devices 300 (e.g., the air conditioner, the washing machine, and the robot cleaner) all at once. However, as illustrated in FIG. 7, two smart lightings may show a plurality of operational information at once. For example, the first smart lighting 100a may show operational information of the first electronic device 300 and the second electronic device 300, and at the same time, the second smart lighting 100b may show operational information of the first electronic device 300 and the third electronic device 300 (for example, the air conditioner, the washing machine, and the robot cleaner).

As described above, the smart lighting 100 may show operational information of the plurality of electronic devices 300 at the same time. Accordingly, the user may not only easily control the plurality of electronic devices 300, but also check the operational states of the plurality of electronic devices 300 at the same time.

FIG. 8 is an exemplary view illustrating a third embodiment in which the operational state of an electronic device is shown through a smart lighting according to an exemplary embodiment of the present disclosure. Hereinafter, description that overlaps with that of FIG. 1 to FIG. 7 will be omitted.

Referring to FIG. 8, the user 10a may generate a control command for the electronic device 300 through voice and/or the remote control 10b. Here, the control command may be "Let me know the remaining operation time of the washing machine" and "Let me know the remaining operation time of the robot cleaner."

When the user utters the control commands of "Let me know the remaining operation time of the washing machine" for the washing machine 300b and "Let me know the remaining operation time of the robot cleaner" for the robot cleaner 300a, the first smart lighting 100a and the second smart lighting 100b may show related operational information of the electronic devices 300 in accordance with the control commands.

In a previous embodiment, the first smart lighting 100a and the second smart lighting 100b displayed, with numbers, the remaining operation times of the washing machine 300b and the robot cleaner 300a. However, in this embodiment, the length of the light in the smart lighting 100 may be gradually reduced, in order to show that the end of the operation of the electronic device 300 is approaching.

In detail, the user who recognizes that the washing machine 300b is in operation may input a control command for checking remaining operation time of the washing machine 300b. Then, in accordance with the inputted control command, the remaining operation time of the washing machine 300b may be shown in the first smart lighting 100a. Here, as the end of the operation of the washing machine 300b approaches, the length of the light in the first smart lighting 100a may gradually be reduced (see (a) and (b) of the first smart lighting 100a).

Similarly, the user who recognizes that the robot cleaner 300a is in operation may input a control command for checking remaining operation time of the robot cleaner 300a. Then, in accordance with the inputted control command, the remaining operation time of the robot cleaner 300a may be shown in the second smart lighting 100b. Here, as the end of the operation of the robot cleaner 300a approaches, the length of the light in the second smart lighting 100*b* may gradually be reduced (see (a) and (b) of the second smart lighting 100*b*).

Here, the user may utter the control commands to check the remaining operation times of the washing machine 300*b* and the robot cleaner 300*a* almost simultaneously with the start of the operations of the washing machine 300*b* and the robot cleaner 300*a*. However, it would generally be the case that the user utters the control commands while the air conditioner 300*c* and the robot cleaner 300*a* are already in operation. Accordingly, even when the user is uttering the control commands to check the remaining operation times for the first time, the lights in the first smart lighting 100*a* and the second smart lighting 100*b* may not be in full lengths.

The operation of the smart lighting 100 may be controlled such that when the user utters a control command for the air conditioner 300*c* after uttering the control commands for the washing machine 300*b* and the robot cleaner 300*a*, the smart lighting 100 stops showing the operational states of the washing machine 300*b* and the robot cleaner 300*a*, and then shows the operational state of the air conditioner 300*c*.

As described above, the smart lighting 100 may show the operational state of the electronic device 300 through the smart lighting 100 until the operation of the electronic device 300 finishes. Accordingly, the user may check the operational states of the electronic devices 300 in real-time.

FIG. 9 is a flow chart illustrating a smart lighting control method according to an exemplary embodiment of the present disclosure, and FIG. 10 is a schematic flow chart illustrating a smart lighting control method according to an exemplary embodiment of the present disclosure. Hereinafter, description that overlaps with that of FIG. 1 to FIG. 8 will be omitted.

Referring to FIG. 9 and FIG. 10, the lighting control server 200 (see FIG. 1) may receive a control command for an operation of an electronic device 300 from a user (S120). The control command may be a command for controlling an on/off operation of the electronic device 300. In addition, a control command for checking an operational state of the electronic device 300 may be a command for checking remaining operation time of the electronic device 300 while the electronic device 300 is in operation, or a command for changing a setting of the electronic device 300 (e.g., the fan speed of the air conditioner, the wind direction of the air conditioner, and the like).

When the control command for an operation of the electronic device 300 is received from the user, the operation of the electronic device 300 may be matched to an operation of the smart lighting 100 in the lighting control server 200 (S140). Here, the matched operation of the smart lighting 100 may be, for example, displaying the remaining operation time of the electronic device 300 or visually showing the setting of the electronic device 300 (e.g., the fan speed of the air conditioner, the wind direction of the air conditioner, and the like).

To this end, the memory 14 of the lighting control server 200 may store therein a matching table used to match an operation of the electronic device 300 to an operation of the smart lighting 100. The matching table may be a learning table for, when a control command for an operation of the electronic device 300 is received, matching the operation of the electronic device 300 to an operation of the smart lighting 100.

When an operation of the smart lighting 100 is matched to the operation of the electronic device 300 on the basis of the matching table, information of the operation of the smart lighting 100 may be transmitted to the smart lighting 100 (S160).

For example, in accordance with the control command of the user, information of the on/off operation of the electronic device 300 or information of remaining operation time of the electronic device 300 may be transmitted to the smart lighting 100.

When the smart lighting 100 receives the information of the operation of the smart lighting 100 (S170), the smart lighting 100 may operate in accordance with the received information of the operation of the smart lighting 100 (S180).

For example, when the user utters "Lower the room temperature" as a control command, the lighting state and the flickering state of the smart lighting 100 may be controlled such that the operation of lowering the set temperature of the air conditioner 300*c* is shown in the smart lighting 100. In detail, a red light in the smart lighting 100 may be turned on, or the set temperature (for example, 20° C.) of the air conditioner 300*c* may be directly displayed on the smart lighting 100.

As described above, when the user wants to control the electronic device 300, the operational information of the electronic device 300 corresponding to the control command may be shown in the smart lighting 100, such that the user may visually check the operational state of the electronic device 300 in accordance with the inputted control command.

In addition, as the information of the operation of the electronic device 300 is shown in the smart lighting 100, the user may check in real-time whether the operation of the electronic devices 300 is being accurately performed in accordance with the inputted control command.

Meanwhile, the smart lighting 100 according to this embodiment of the present disclosure may show multiple operational information of a plurality of electronic devices 300 at the same time. Accordingly, the user may not only control the plurality of electronic devices 300 at the same time, but also check the operational states of the plurality of electronic devices 300 at the same time.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A lighting control server for controlling smart lighting, the lighting control server comprising:
    an input interface configured to receive information, via a communication from an electronic device, wherein the information corresponds to at least one control command for an operation of the electronic device;
    a memory configured to store a matching table, wherein the matching table includes data matching the operation of the electronic device to a corresponding operation for the smart lighting; and
    a transmitter configured to transmit, to the smart lighting, information for the operation of the smart lighting that is matched to the corresponding operation of the electronic device corresponding to the at least one control command, based on the data of the matching table.

2. The lighting control server according to claim 1, wherein the input interface comprises at least one of:
    a voice input interface configured to receive a user's voice; or
    a controller which communicates with the electronic device and includes a plurality of buttons for selecting any of a plurality of operations of the electronic device.

3. The lighting control server according to claim 2, wherein the operation of the electronic device is one of the plurality of operations for the electronic device;
    wherein the matching table includes data matching each of the plurality of operations of the electronic device to a corresponding operation, among a plurality of operations, that can be performed by the smart lighting;
    wherein the at least one control command is at least one of:
        a command for controlling an on/off operation of the electronic device,
        a command for checking remaining operation time of the electronic device, or
        a command for controlling a performable operation of the electronic device.

4. The lighting control server according to claim 3, wherein the plurality of operations of the smart lighting include at least one of:
    a change in color or brightness of the smart lighting in accordance with the on/off operation of the electronic device;
    a change in color or brightness of a portion of the smart lighting corresponding to a position at which the electronic device is operating;
    a change in color or brightness in each section of the smart lighting in accordance with remaining operation time of the electronic device; or
    displaying on the smart lighting of the remaining operation time of the electronic device.

5. The lighting control server according to claim 4, wherein the smart lighting comprises a first portion and a second portion, and
wherein the transmitter comprises:
    a first transmitter configured to transmit, to the first portion, information of an operation of the smart lighting corresponding to information of an operation of any one electronic device located indoors; and
    a second transmitter configured to transmit, to the second portion, information of an operation of the smart lighting corresponding to information of an operation of another electronic device located indoors.

6. Smart lighting, comprising:
    a lighting-side receiver configured to receive information relating to an operation of an electronic device, the information corresponding to at least one control command for the operation of the electronic device;
    a memory configured to store a matching table, wherein the matching table includes data matching the received information relating to the operation of the electronic device to a corresponding operation for the smart lighting; and
    a controller configured to control the smart lighting based on the received information that matches to the corresponding operation of the smart lighting, based on the data of the matching table.

7. The smart lighting according to claim 6, wherein the lighting-side receiver comprises:
    a first receiver configured to receive information of an operation of any one electronic device located indoors; and
    a second receiver configured to receive information of an operation of another electronic device located indoors.

8. The smart lighting according to claim 7, wherein the receiver receives position information of the electronic device.

9. The smart lighting according to claim 6, wherein the operation of the smart lighting comprises at least one of:
    a change in color or brightness of the smart lighting in accordance with an on/off operation of the electronic device;
    a change in color or brightness portion of the smart lighting corresponding to a position at which the electronic device is operating;

a change in color or brightness in each section of the smart lighting in accordance with remaining operation time of the electronic device; or displaying on the smart lighting the remaining operation time of the electronic device.

10. The smart lighting according to claim 6, wherein the controller is further configured to control the operation of the smart lighting such that the brightness of the smart lighting is gradually reduced or gradually increased in accordance with the operation of the electronic device.

11. An electronic device communicating with a smart lighting, the electronic device comprising:

a receiver configured to receive at least one control command for an operation of the electronic device;

a memory configured to store a matching table, wherein the matching table includes data matching the operation of the electronic device to a corresponding operation for the smart lighting; and a transmitter configured to transmit, to the smart lighting, information for operation of the smart lighting that is matched to the corresponding operation of the electronic device corresponding to the received at least one control command, based on the data of the matching table.

12. The electronic device according to claim 11, wherein the receiver comprises at least one of:

a voice input interface configured to receive a user's voice; or a controller including a plurality of buttons for selecting any of a plurality of operations of the electronic device.

13. The electronic device according to claim 12, wherein the at least one control command is at least one of:

a command for controlling an on/off operation of the electronic device, a command for checking remaining operation time of the electronic device, or a command for controlling a performable operation of the electronic device.

14. The electronic device according to claim 11, wherein a plurality of operations of the smart lighting include at least one of:

a change in color or brightness of the smart lighting in accordance with the on/off operation of the electronic device;

a change in color or brightness of a portion of the smart lighting corresponding to a position at which the electronic device is operating;

a change in color or brightness in each section of the smart lighting in accordance with remaining operation time of the electronic device; or displaying on the smart lighting the remaining operation time of the electronic device.

15. The electronic device according to claim 11, wherein the smart lighting comprises a plurality of portions, wherein the receiver receives information that one or more of the plurality of portions are in an on-state, and wherein the transmitter transmits, to at least one of the one or more of the plurality of portions that are in the on-state, information of the operation of the smart lighting matched to the corresponding operation of the electronic device.

16. A method for a lighting control server, the method comprising:

receiving information, via a communication from an electronic device, wherein the information corresponds to at least one control command for an operation of the electronic device;

matching the operation of the electronic device to a corresponding operation for smart lighting; and transmitting, to the smart lighting, information to cause operation of the smart lighting based on the operation of the smart lighting that matches to the corresponding operation of the electronic device corresponding to the at least one control command.

17. The method according to claim 16, wherein the receiving the information comprises any one of:

receiving a user's voice; or receiving a control command of the user corresponding to the operation of the electronic device, through a controller communicating with the electronic device.

18. The method according to claim 17, wherein the receiving the information comprises at least one of:

inputting, by the user, a command for controlling an on/off operation of the electronic device;

inputting, by the user, a command for checking remaining operation time of the electronic device; and inputting, by the user, a command for controlling a performable operation of the electronic device.

19. The method according to claim 16, wherein the smart lighting comprises a first portion and a second portion, and wherein the transmitting the information comprises:

transmitting, to the first portion, information of an operation of any one electronic device located indoors; and transmitting, to the second portion, information of an operation of another electronic located indoors.

* * * * *